(12) United States Patent
Giles et al.

(10) Patent No.: US 6,628,619 B1
(45) Date of Patent: Sep. 30, 2003

(54) AUTOMATIC TRANSMIT-RECEIVE PATH CONFIGURATION FOR A NETWORK TESTER

(75) Inventors: John M. Giles, Everett, WA (US); Jean-Pierre Thibaut, Mill Creek, WA (US); William F. Winston, Fall City, WA (US)

(73) Assignee: Fluke Corporation, Everett, WA (US)

( * ) Notice: Subject to any disclaimer, the term of this patent is extended or adjusted under 35 U.S.C. 154(b) by 0 days.

(21) Appl. No.: 09/520,934

(22) Filed: Mar. 8, 2000

(51) Int. Cl.[7] ............................................. H04L 12/26
(52) U.S. Cl. ...................................................... 370/248
(58) Field of Search ................................ 370/241, 248, 370/249, 250, 251, 254, 276, 282; 340/514; 379/1.01, 1.03, 1.04, 10.01, 12, 15.01, 16, 1.7, 19

(56) References Cited

U.S. PATENT DOCUMENTS 4,843,620 A * 6/1989 Hagedorn .................... 379/21
5,343,461 A * 8/1994 Barton et al. ................ 370/249

* cited by examiner

*Primary Examiner*—Kwang Bin Yao
(74) *Attorney, Agent, or Firm*—George T. Noe; Richard A. Koske

(57) ABSTRACT

A method and apparatus are provided for determining which path of a network transmission link having a receive path and a transmit path is carrying receive signals, and then automatically configuring a network tester such that an internal transmitter and an internal receiver match the transmit and receive paths of the network. Initially, both paths are monitored by the tester's receiver to determine whether there is traffic on the network. Then the tester automatically configures its interface to designate a first one of the paths as the receive path, and tests this configuration to determine whether the internal receiver receives a signal. If a signal is received, the configuration is verified. If no signal is received, the tester reconfigures the interface to designate the other path as the receive path. Once the network receive path is identified, the tester automatically configures its interface such that the transmit path is set opposite the receive path.

2 Claims, 2 Drawing Sheets

AUTOMATIC TRANSMIT-RECEIVE PATH CONFIGURATION FOR A NETWORK TESTER

BACKGROUND OF THE INVENTION

This invention relates generally to network testing, and in particular to automatically configuring the transmit and receive paths of a network tester to interface with a network.

Packet-switched networks such as Frame Relay have become popular for internet access, LAN (Local Area Network)-to-LAN connection, automated teller machine connection, point-of-sale cash registers, small business and retail store access to central data services, and other wide area data communication services. To meet the increasing demands for installation and basic throughput testing of packet-switched networks, test equipment is being developed that can both diagnose problems and passively monitor Frame Relay traffic in both directions to determine or verify network performance.

In connecting such test equipment to a network port, one important aspect of testing before throughput can even be monitored is to determine which pair of a four-wire cable or transmission link is the transmit pair and which is the receive pair. Wire mapping techniques are available, but are slow and tedious. They are carried out with the cabling disconnected, and require extra equipment such as remote terminations. It would be desirable to determine which pair is which while traffic is being throughput on the network.

SUMMARY OF THE INVENTION

In accordance with the present invention, a method and apparatus are provided for automatically configuring the transmit and receive paths of a network tester by determining which path is carrying transmit signals and which path is carrying receive signals while the tester is connected to a network under test. Initially, both the transmit and receive paths in a transmission link or cable are monitored simultaneously. That is, both pairs of wire in a four-wire cable initially are coupled to a receiver in the tester.

When a receive signal indication is given by the tester, it is an indication of traffic on one of the two transmission paths. The tester automatically then configures its interface to designate a first one of the two paths as the receive path and tests the configuration to see if a signal on the first path is indeed received. If a signal is received, the designated receive path is in fact the receive path, and by deduction, the other path is the transmit path. If no signal is received, however, then the tester automatically reconfigures its interface to designate the second path as the receive path and tests the new configuration to determine if a signal is received. If the signal is lost, meaning that the network traffic is sporadic or has stopped altogether, the tester will automatically repeat the configuration testing. Once the receive path is identified, then the transmit path is set opposite to the receive path.

This method of automatically configuring the transmit and receive paths of the tester interface relieves the user of the tester from knowing, or having to determine, which path is which before using the tester. While the embodiment shown and described herein is with reference to a multiple-wire network cable having at least two twisted pairs of wire, for example, a four-wire cable system, it should be noted that this technique works equally well for T1, E1, or DDS transmission interfaces, and can be applied to other full duplex metallic interfaces such as T3 or E3.

It is therefore one object of the present invention to automatically determine which path of a network transmission link having separate transmit and receive paths is the transmit path and which is the receive path.

It is another object of the present invention to automatically configure the transmit and receive paths of a tester interface.

It is a further object of the present invention to provide a method for determining transmit and receive paths in a network transmission link for a wide range of service levels and protocols.

Other objects, features, and advantages of the present invention will become obvious to those having ordinary skill in the art upon a reading of the following description when taken in conjunction with the accompanying drawings.

DETAILED DESCRIPTION OF THE INVENTION

Figure 1:
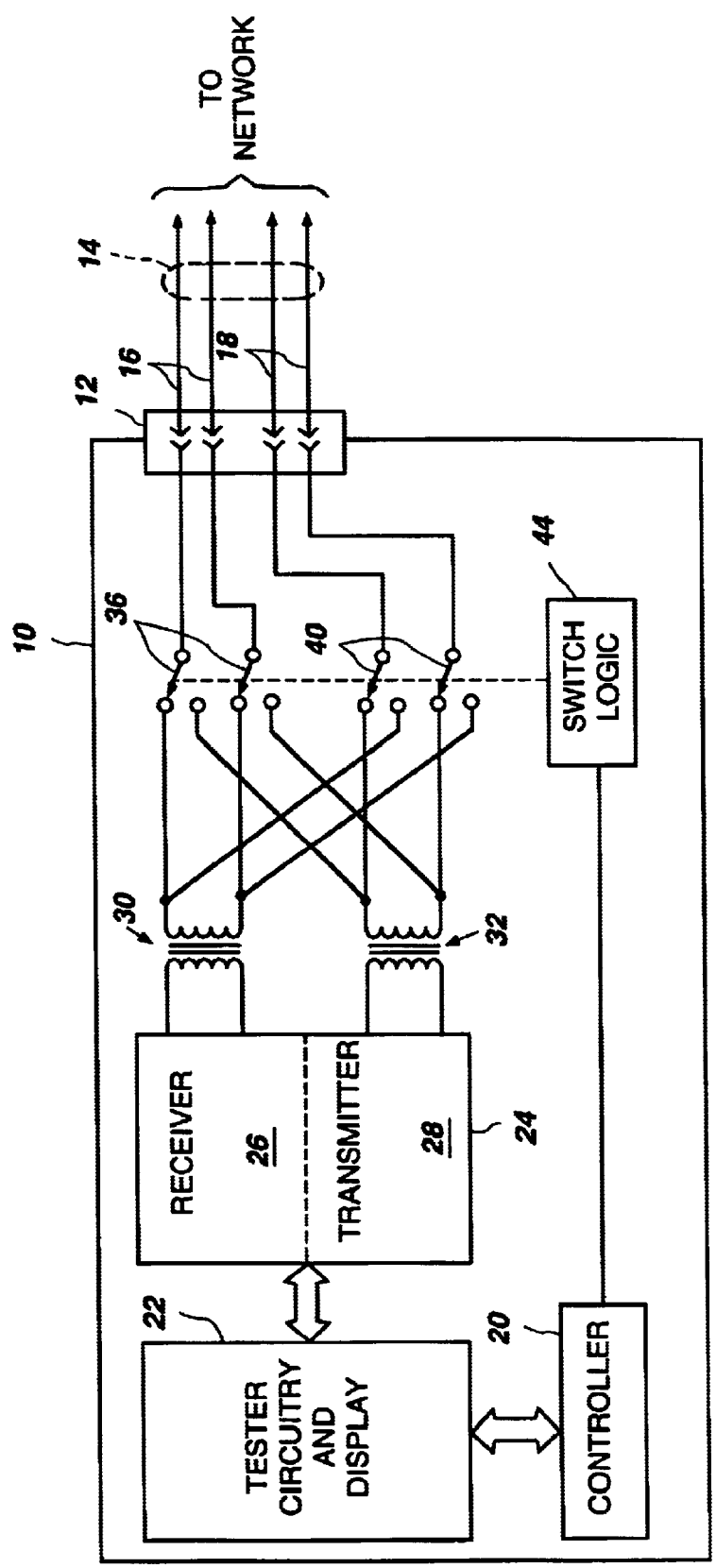
FIG. 1 is a schematic diagram of an automatically configurable tester interface for coupling to a network port in accordance with the present invention.

Referring to FIG. 1 of the drawings, a network test instrument 10 is shown connected via a connector 12 to a transmission link of a network under test represented by a four-wire cable 14 comprising two twisted pairs of wire 16 and 18. Four-wire cable 14 may suitably be of the type used in telephone cables and the like, and thus is conventional and is well known in the art. Connector 12 may suitably an RJ-45 connector, which is also conventional and well known in the art.

Test instrument 10 includes a controller 20 for controlling operation of the test instrument, tester circuitry and display 22 coupled to the controller 20 for analyzing and displaying test information received from a network, and a duplexer 24 coupled to the tester circuitry and display 22 for communicating with a network that is to be tested. Duplexer 24 includes a receiver 26 and a transmitter 28 adapted for communicating with two-wire transmission lines, such as the well-known twisted pairs mentioned earlier. Isolation transformers 30 and 32 are interposed in the receive and transmit transmission paths to isolate receiver 26 and transmitter 28 from the network under test.

Since it is unknown which one of twisted pairs 16 and 18 is the transmit path and which is the receive path prior to connecting the test instrument 10 to a network under test represented by cable 14, independently-operable switches 36 and 40 are provided both to permit the receiver channel to simultaneously monitor traffic on both twisted pairs 16 and 18 and to permit the inputs circuits of instrument 10 to be configured to match the network. In the position of switches 36 and 40 shown in FIG. 1, the dual contacts of switch 36 are connected to isolation transformer 30 in the receive path, and the dual contacts of switch 40 are connected to isolation transformer 32 in the transmit path. Both switches 36 and 40 are operated by a switch logic circuit 44, which receives its command signals from controller 20. Switch logic circuit 44 is shown by a dashed line to control operation of switches 36 and 40; however, it should be understood that switches 36 and 40 may be operated independently of one another. As will be seen shortly, when operated by switch logic 44, switches 36 and 40 may be in the positions shown in FIG. 1, or they may be such that both are connected to isolation transformer 30, or switch 36 may be connected to isolation transformer 32 while switch is connected isolation transformer 30.

The test instrument 10 shown in FIG. 1 functions equally well for a number of network testing environments, including T1, E1, and Digital Data Service (DDS) transmission port or interface. In a proposed commercial embodiment, the slight changes in components and connectors to match to different types of networks and cabling are provided in interchangeable interface "noses," or modules.

Figure 2:
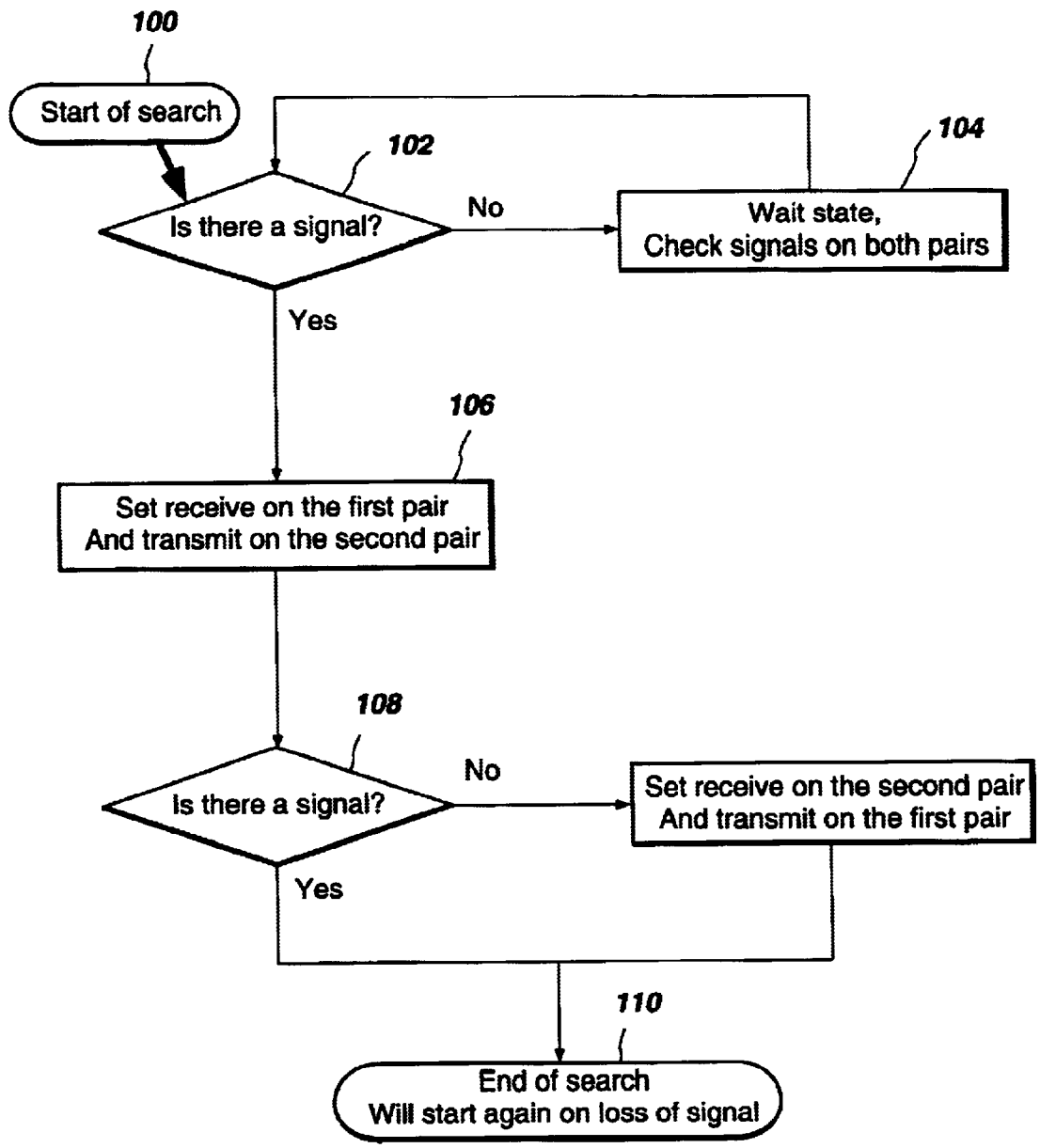
FIG. 2 is a flow chart of a test program for determining the transmit and receive pairs of a four-wire network cable.

FIG. 2 is a flow chart of a test program used by test instrument 10 to determine the transmit and receive pairs of cable 14 and automatically configure the transmit and receive paths of the test instrument input interface to match a network under test.

The test instrument 10 initialized in step 100, Start of search. Controller 20 sends an initialization command to switch logic 44, which turn causes the dual contacts of both switches 36 and 40 be connected to isolation transformer 30. This permits receiver 26, tester circuitry and display 22 and controller 20 to monitor traffic on both pairs of wire 16 and 18 simultaneously.

In step 102, controller 20 interrogates the receiver channel and asks, "Is there a signal?" If no signal is received, step 104 is entered, which is a wait state. Controller 20 periodically cycles between steps 102 and 104 until traffic on the network under test results in detection of a signal by receiver 26. When a receive signal indication is given by the tester, it is an indication of traffic on one of the two twisted pairs of wire 16 and 18.

In step 106, controller 20 sends a command to switch logic circuit 44 to set switches 36 and 40 such that receiver 26 is connected to one of the twisted pairs 16 and 18, and transmitter 28 is connected to the other. Let us assume for this discussion that switches 36 and 40 are set as shown in FIG. 1 wherein receiver 26 is connected to twisted pair 16 and transmitter 28 is connected to twisted pair 18. Seeing if network traffic is received on twisted pair 16 tests this configuration.

In step 108, the controller 20 again interrogates the receiver channel and asks, "Is there a signal?" If a signal is received, indicating network traffic, the designated receive twisted pair, e.g., pair 16 in our example, is in fact the receive pair and the search ends in step 110.

If no signal is received in step 108, then controller 20 sends a command to switch logic 44 to reconfigure the interface circuit paths by connecting the receiver 26 via switch 40 to twisted pair 18 and connecting the transmitter 28 via switch 36 to twisted pair 16, and the search ends in step 110.

It should be noted that in step 110 if the network traffic signal is lost, the procedure beginning with step 100 will be repeated.

The method herein described of automatically configuring the transmit and receive paths of the test instrument interface relieves the user of the instrument from knowing, or having to determine, which path is which before using the tester. The techniques of the present invention works equally well for T1, E1, or DDS transmission interfaces, and can be applied to other full duplex metallic interfaces such as T3 or E3.

While we have shown and described the preferred embodiment of our invention, it will be apparent to those skilled in the art that many changes and modifications may be made without departing from our invention in its broader aspects. It is therefore contemplated that the appended claims will cover all such changes and modifications as fall within the true scope of the invention.

What we claim as our invention is:

1. A method for automatically determining transmit and receive paths in a network, comprising the steps of:

(a) coupling a test instrument having a receiver and a transmitter to said network;

(b) configuring said test instrument such that said receiver is coupled to both of said transmit and receive paths simultaneously;

(c) detecting traffic on said network in the form of a received signal;

(d) configuring said test instrument such that said receiver is coupled to only a first one of said paths; and (e) determining whether a signal is received from said first one of said paths, whereby if a signal is received, said first one of said paths is determined to be the receive path, and if no signal is received, then said second one of said paths is determined be the receive path.

2. A method in accordance with claim 1 further including the step of automatically configuring said test instrument such that said receiver is coupled to said receive path and said transmitter is coupled to said transmit path.

* * * * *